United States Patent
Fuse et al.

(10) Patent No.: US 10,603,887 B2
(45) Date of Patent: Mar. 31, 2020

(54) APPARATUS FOR MANUFACTURING MULTILAYER ELECTRODE

(71) Applicant: JTEKT CORPORATION, Osaka-shi (JP)

(72) Inventors: Masaru Fuse, Kashihara (JP); Kazuya Suzuki, Kariya (JP); Takafumi Fujii, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 262 days.

(21) Appl. No.: 15/670,618

(22) Filed: Aug. 7, 2017

(65) Prior Publication Data

US 2018/0043672 A1    Feb. 15, 2018

(30) Foreign Application Priority Data

Aug. 12, 2016  (JP) .................... 2016-158430

(51) Int. Cl.

| | |
|---|---|
| H01M 4/08 | (2006.01) |
| H01M 10/04 | (2006.01) |
| H01G 11/86 | (2013.01) |
| B32B 37/10 | (2006.01) |
| H01G 11/50 | (2013.01) |
| B32B 37/14 | (2006.01) |
| B32B 41/00 | (2006.01) |
| H01G 11/06 | (2013.01) |

(52) U.S. Cl.
CPC .............. *B32B 37/10* (2013.01); *B32B 37/14* (2013.01); *B32B 41/00* (2013.01); *H01G 11/50* (2013.01); *H01G 11/86* (2013.01); *H01M 4/08* (2013.01); *H01M 10/045* (2013.01); *H01M 10/0431* (2013.01); *B32B 2250/40* (2013.01); *B32B 2457/10* (2013.01); *B32B 2457/16* (2013.01); *H01G 11/06* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 2006/0051652 A1* | 3/2006 | Samuels | ............. B65H 29/241 29/623.1 |
| 2010/0132308 A1* | 6/2010 | Kadowaki | ............. B65H 39/14 53/212 |

FOREIGN PATENT DOCUMENTS

| | | |
|---|---|---|
| JP | 61-198575 | 9/1986 |
| JP | 9-274910 | 10/1997 |

* cited by examiner

*Primary Examiner* — Barbara J Musser
(74) *Attorney, Agent, or Firm* — Oblon, McClelland, Maier & Neustadt, L.L.P.

(57) ABSTRACT

An apparatus includes a control device for a first suction portion, a second suction portion, and a folding portion so that each time a separator is folded, a positive electrode and a negative electrode are alternately sandwiched between folded surfaces of the separator. The control device controls the at least one of the first suction portion and the second suction portion so that doping foil is bonded to one of a current collector, the positive electrode, and the negative electrode sucked and held by the at least one of the first suction portion and the second suction portion. The control device controls the at least one of the first suction portion and the second suction portion so that the one of the current collector, the positive electrode, and the negative electrode having the lithium metal foil bonded thereto is transported and sandwiched between a predetermined pair of the folded surfaces of the separator.

5 Claims, 13 Drawing Sheets

APPARATUS FOR MANUFACTURING MULTILAYER ELECTRODE

INCORPORATION BY REFERENCE

The disclosure of Japanese Patent Application No. 2016-158430 filed on Aug. 12, 2016 including the specification, drawings and abstract, is incorporated herein by reference in its entirety.

BACKGROUND OF THE INVENTION

1. Field of the Invention

The invention relates to an apparatus and method for manufacturing a multilayer electrode.

2. Description of Related Art

A lithium-ion capacitor attracts a lot of attention as an electric energy storage device. The lithium-ion capacitor has a multilayer electrode where the negative electrode of a lithium-ion secondary battery and the positive electrode of an electric double layer capacitor are stacked on top of one another. The negative electrode doped with lithium ions allows the lithium-ion capacitor to have high energy density, compared to the electric double layer capacitor. In the manufacture of the multilayer electrode, first a doping member is manufactured by attaching lithium metal foil to a current collector for doping, and then the positive electrode, the negative electrode, and the doping member are stacked on top of one another.

The doping member is manufactured, for example, as follows, according to Japanese Patent Application Publication No. H09-274910 (JP H09-274910 A). A pole plate (a current collector for doping) wrapped around a first roller and lithium metal foil wrapped around a second roller are superimposed on one another, and nipped and drawn between a transfer roller and a nip roller opposed to the transfer roller. The transfer roller cuts the lithium metal foil into a predetermined length, and the nip roller presses the cut lithium metal foil against the pole plate, thus attaching the lithium metal foil to the pole plate. Then, the doping member is completed by cutting the pole plate into a predetermined length.

The multilayer electrode is manufactured, for example, as follows, according to Japanese Patent Publication No. H05-46669 (JP H05-46669 B). First, a stack structure is formed by folding a separator in a zigzag pattern while sandwiching a positive electrode and a negative electrode alternately between folded surfaces of the separator each time the separator is folded. Then, the multilayer electrode is completed by stacking a doping member, through the separator, on one side of the stack structure in a direction that the electrodes and the separator are stacked in.

The conventional manufacture of a multilayer electrode requires two separate processes: a process for manufacturing a doping member, and a process for manufacturing the multilayer electrode by using the doping member. Using two separate processes makes it likely that size of the manufacturing apparatus becomes larger and that the manufacturing cost becomes higher. Further, in order to reduce the time necessary for doping, the doping member needs to be placed at a predetermined location in the stack structure. In this regard, the conventional manufacture of a multilayer electrode requires that the doping member be stacked after the stack structure is manufactured. Accordingly, it is difficult to place the doping member at the predetermined location in the stack structure.

SUMMARY OF THE INVENTION

An object of the invention is to provide an apparatus and method for making it possible to place a doping member at a predetermined location in a stack structure of positive and negative electrodes in a simple manner, thereby manufacturing a multilayer electrode.

A first aspect of the invention provides an apparatus for manufacturing a multilayer electrode. The apparatus includes the following: a first suction portion that has a suction surface for sucking and holding a sheetlike positive electrode and that is movable in a direction parallel to the suction surface of the first suction portion; a second suction portion that is located beside the first suction portion in a direction parallel to the suction surface of the first suction portion, that has a suction surface for sucking and holding a sheetlike negative electrode, and that is movable in a direction parallel to the suction surface of the second suction portion; a folding portion for folding a tapelike separator; and a control device for controlling the operation of the first suction portion, the second suction portion, and the folding portion.

The control device includes a sandwiching control portion, a doping foil bonding control portion, and a doping foil sandwiching control portion. The sandwiching control portion controls the operation of the first suction portion, the second suction portion, and the folding portion so that each time the separator is folded, the positive electrode and the negative electrode are alternately sandwiched between folded surfaces of the separator. The doping foil bonding control portion controls the operation of at least one of the first suction portion and the second suction portion so that doping foil is bonded to one of a current collector for doping, the positive electrode, and the negative electrode sucked and held by the at least one of the first suction portion and the second suction portion. The doping foil sandwiching control portion controls the at least one of the first suction portion and the second suction portion so that the one of the current collector, the positive electrode, and the negative electrode having the doping foil bonded thereto is transported and sandwiched between a predetermined pair of the folded surfaces of the separator.

As such, the apparatus stacks the positive electrode and the negative electrode on the separator while bonding the doping foil to one of the current collector, the positive electrode, and the negative electrode and while sandwiching the one of the current collector, the positive electrode, and the negative electrode having the doping foil bonded thereto between the folded surfaces of the separator. This makes it possible to reduce the size of the apparatus and the manufacturing cost of the multilayer electrode. Further, the apparatus makes it possible to place the one of the current collector, the positive electrode, and the negative electrode having the doping foil bonded thereto at a predetermined location in a stack structure of the positive electrode and the negative electrode, thus reducing the time necessary for doping.

A second aspect of the invention provides a method for manufacturing a multilayer electrode by alternately sandwiching a sheetlike positive electrode and a sheetlike negative electrode between folded surfaces of a separator each time the separator is folded, and by sandwiching one of a current collector for doping, the positive electrode, and the negative electrode having doping foil bonded thereto between a predetermined pair of the folded surfaces of the separator. The method includes a first sandwiching process, a second sandwiching process, a bonding process, and a third sandwiching process. The first sandwiching process includes the following: sucking and holding one of the positive electrode and the negative electrode; transporting the one of the positive electrode and the negative electrode to a stacking location; and sandwiching the one of the positive electrode and the negative electrode between the folded surfaces of the separator fed to the stacking location. The second sandwiching process includes the following: sucking and holding the other of the positive electrode and the negative electrode; transporting the other of the positive electrode and the negative electrode to the stacking location; and sandwiching the other of the positive electrode and the negative electrode between the folded surfaces of the separator folded by transportation of the other of the positive electrode and the negative electrode to the stacking location. The bonding process is performed when the predetermined pair of the folded surfaces of the separator appears and includes the following: sucking and holding the one of the current collector, the positive electrode, and the negative electrode; transporting the one of the current collector, the positive electrode, and the negative electrode to a bonding location; and bonding the doping foil fed to the bonding location to the one of the current collector, the positive electrode, and the negative electrode. The third sandwiching process includes the following: transporting the one of the current collector, the positive electrode, and the negative electrode having the doping foil bonded thereto to the stacking location; and sandwiching the one of the current collector, the positive electrode, and the negative electrode having the doping foil bonded thereto between the predetermined pair of the folded surfaces of the separator. Thus, the method according to the second aspect has the same effect as the apparatus according to the first aspect.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a diagram illustrating a lithium ion capacitor, employing a multilayer electrode, viewed from a direction perpendicular to a direction that electrodes are stacked in;

DETAILED DESCRIPTION OF EMBODIMENTS

Figure 1:
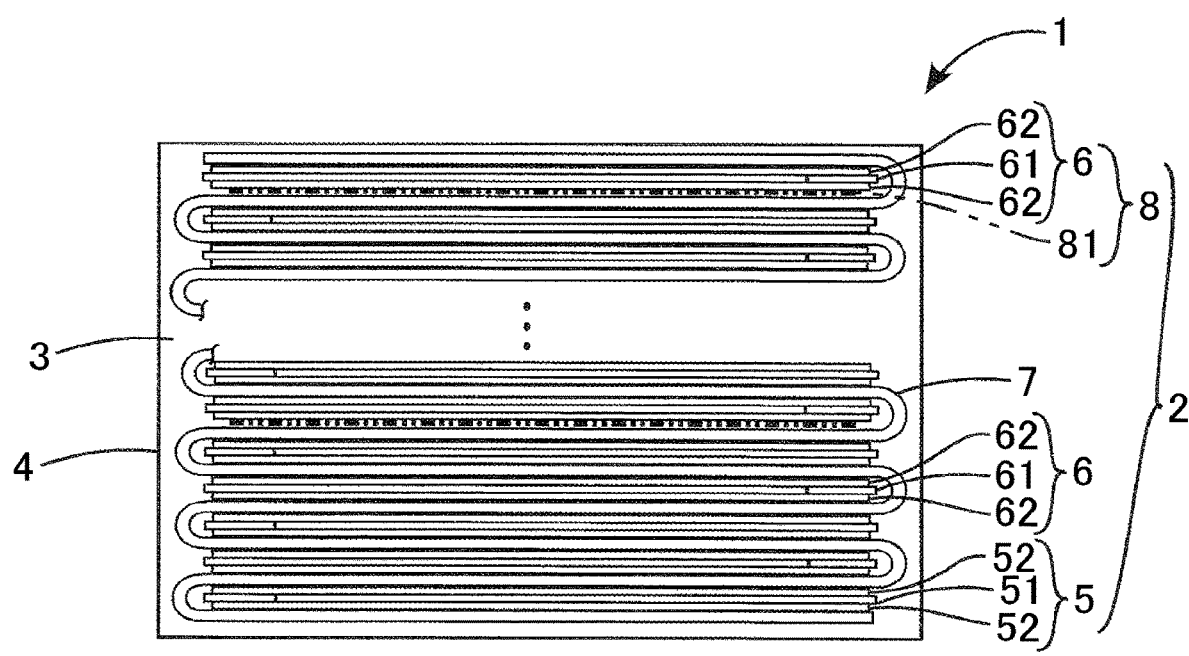

A multilayer electrode 2 manufactured by an apparatus 10 according to an embodiment of the invention is described below with reference to the drawings. As illustrated in FIG. 1, the multilayer electrode 2 is used for a lithium ion capacitor 1. The lithium ion capacitor 1 includes the multilayer electrode 2, an electrolyte 3, and a baglike cover 4. The multilayer electrode 2 and the electrolyte 3 are placed in the cover 4, and the cover 4 is sealed. The multilayer electrode 2 includes multiple sheetlike positive electrodes 5, multiple sheetlike negative electrodes 6, and a tapelike separator 7 folded in a zigzag pattern. The positive electrodes 5 and the negative electrodes 6 are alternately sandwiched between each pair of folded surfaces of the separator 7 folded in a zigzag pattern. Specifically, the separator 7 is inserted between one of the positive electrodes 5 and one of the negative electrodes 6 such that each of the positive electrodes 5 and the negative electrodes 6 is sandwiched between a corresponding one of the pairs of the folded surfaces of the separator 7.

Figure 2:
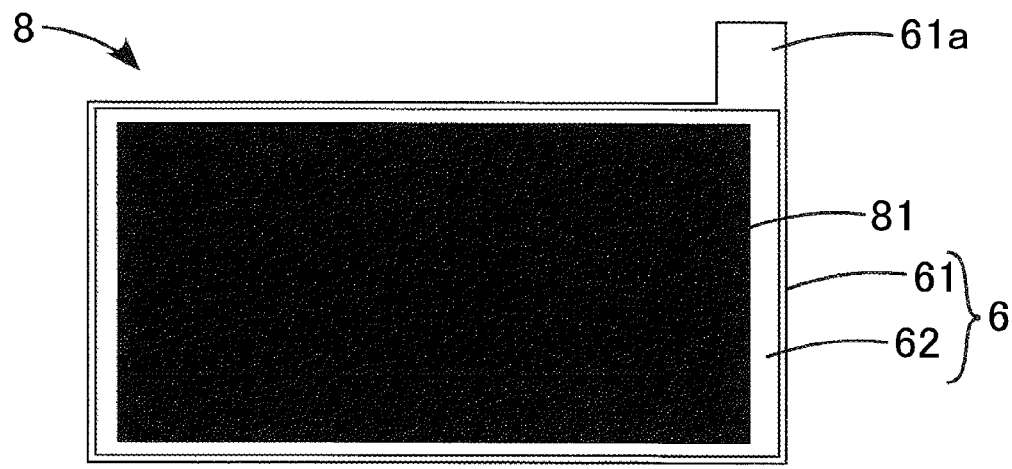
FIG. 2 is a plan view of a doping member in FIG. 1.

In the manufacturing process of the lithium ion capacitor 1, the negative electrodes 6 need to be doped with lithium ions. For this reason, the multilayer electrode 2 includes multiple pieces of lithium metal foil 81 (corresponding to doping foil according to the invention). As illustrated in FIG. 2, the lithium metal foil 81 is bonded to one side of predetermined ones of the negative electrodes 6 so that the negative electrodes 6 having the lithium metal foil 81 bonded thereto are arranged at predetermined intervals in the multilayer electrode 2. In FIG. 1, the lithium metal foil 81 is represented by a long dashed double-short dashed line because the lithium metal foil 81 disappears as a result of doping.

Figure 3:
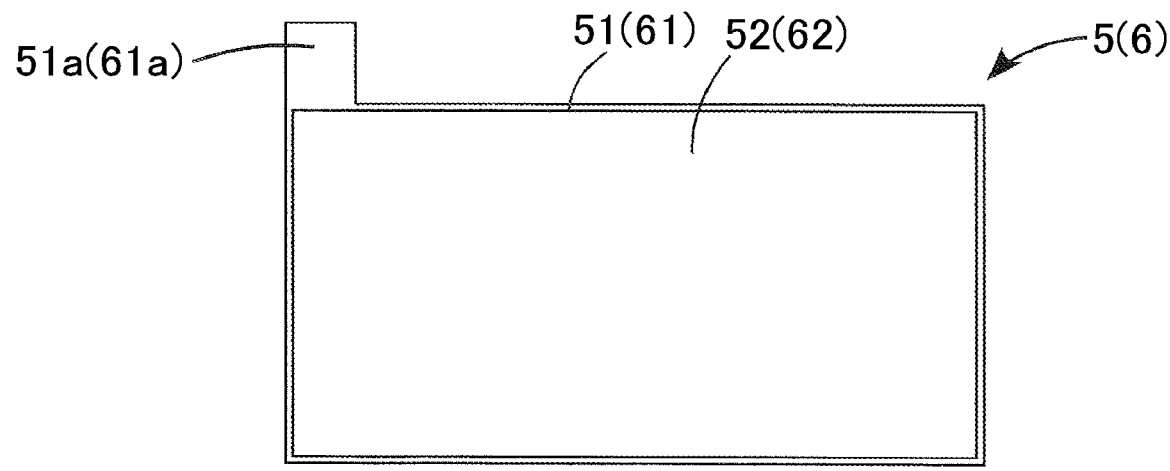
FIG. 3 is a plan view of a positive electrode (or a negative electrode) in FIG. 1.

As illustrated in FIG. 3, each of the positive electrodes 5 includes rectangular positive current collector foil 51 made of metal and a positive electrode active material layer 52 that is disposed on each side of the positive current collector foil 51 by coating or other suitable method. Each of the negative electrodes 6 includes rectangular negative current collector foil 61 made of metal and a negative electrode active material layer 62 that is disposed on each side of the negative current collector foil 61 by coating or other suitable method. The negative current collector foil 61 has the same shape as the positive current collector foil 51. The positive current collector foil 51 has a positive external terminal 51*a* protruding from one of the corners of the positive current collector foil 51. The negative current collector foil 61 has a negative external terminal 61*a* protruding from one of the corners of the negative current collector foil 61. The tip ends of the positive external terminal 51*a* and the negative external terminal 61*a* extend out of the cover 4 from opposite ends of the cover 4. The separator 7 is made of an electrical insulating material that prevents a short circuit between the positive electrode 5 and the negative electrode 6. The electrolyte 3 is a non-aqueous solution containing lithium ions. The cover 4 is made of a plastic film.

The positive current collector foil 51 is made of aluminum, aluminum alloy, or other similar material. The positive electrode active material layer 52 includes a binder, a conducting agent, and a carbon material for reversibly carrying anions and cations. The conducting agent is, for example, carbon black such as acetylene black or Ketjen black, natural graphite, thermal expansion graphite, or carbon fiber. The binder is, for example, a fluorine resin such as polytetrafluoroethylene or polyvinylidene difluoride, a rubber binder such as styrene-butadiene rubber, or a thermoplastic resin such as polypropylene or polyethylene. The negative current collector foil 61 is made of copper, copper alloy, nickel, stainless, or other similar material. The negative electrode active material layer 62 includes a carbon material such as graphite or amorphous carbon, a binder, and a conducting agent. The binder and the conducting agent of the negative electrode active material layer 62 are the same as or similar to those of the positive electrode active material layer 52.

The material used for making the separator 7 is a material that provides electrical insulation and that allows the electrolyte 3 to permeate easily. For example, the separator 7 is paper made of viscose rayon or native cellulose, or is a non-woven fabric made of polyethylene or polypropylene. The solvent of the electrolyte 3 is, for example, ethylene carbonate, propylene carbonate, dimethyl carbonate, diethyl carbonate, methyl ethyl carbonate, $\gamma$-Butyrolactone, acetonitrile, dimethoxyethane, tetrahydrofuran, dioxolan, methylene chloride, or sulfolane.

Figure 4:
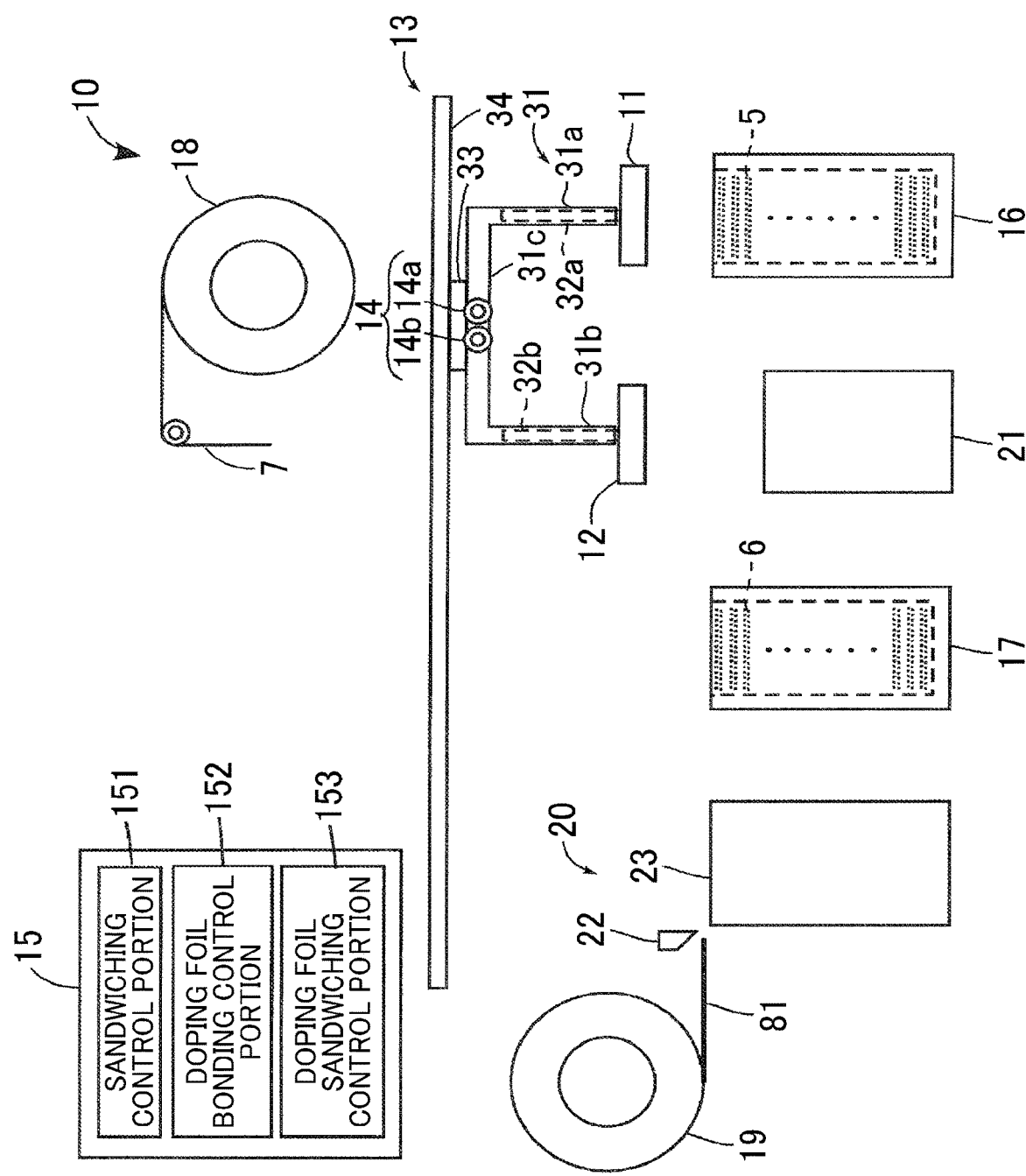
FIG. 4 is a diagram illustrating the structure of an apparatus, according to an embodiment of the invention, for manufacturing a multilayer electrode.

The structure of the apparatus 10 for manufacturing the multilayer electrode 2 is described with reference to the drawings. As illustrated in FIG. 4, the apparatus 10 includes a first suction portion 11, a second suction portion 12, a transporting portion 13, a folding portion 14, a control device 15, a positive electrode magazine 16, a negative electrode magazine 17, a separator roll 18, a doping foil roll 19, a doping foil feeder 20, and a stacking table 21.

The first suction portion 11 has a hollow box shape and uses negative pressure to suck and hold one side of the positive electrode 5 on the bottom surface of the first suction portion 11. The second suction portion 12 has the same hollow box shape as the first suction portion 11 and uses negative pressure to suck and hold one side of the negative electrode 6 on the bottom surface of the second suction portion 12. Further, the second suction portion 12 presses the negative electrode 6 held on the bottom surface of the second suction portion 12 against the lithium metal foil 81, thereby bonding the lithium metal foil 81 to the negative electrode 6.

Figure 5:
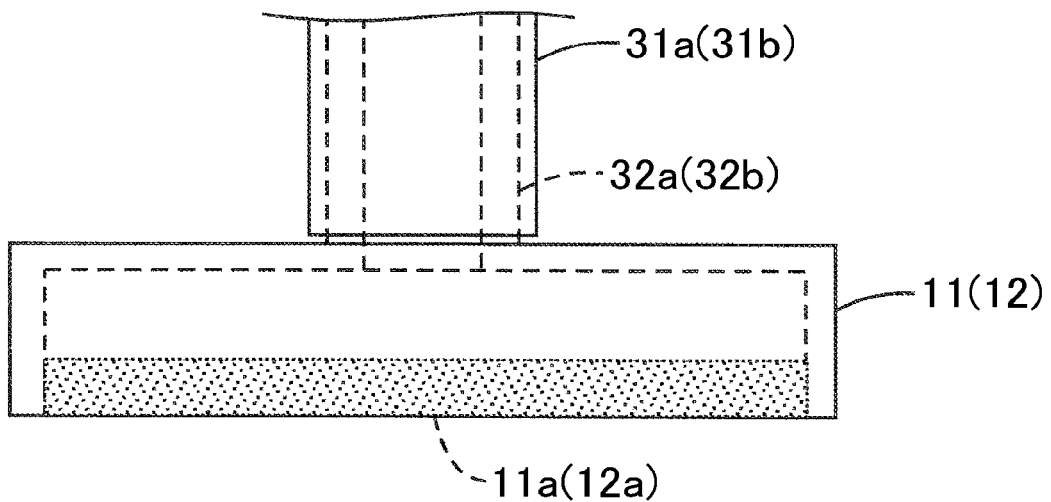
FIG. 5 is a diagram illustrating a main part of first and second suction portions of the apparatus.

As illustrated in FIG. 5, the suction surfaces (i.e., the bottom surfaces) of the first suction portion 11 and the second suction portion 12 are respectively provided with suction members 11*a* and 12*a* each having a through hole. The suction member 11*a* of the first suction portion 11 is made of any material that allows the suction member 11*a* to suck and hold one side of the positive electrode 5. For example, the suction member 11*a* is made of metal, resin, ceramic, or rubber. The suction member 12*a* of the second suction portion 12 is made of any material that allows the suction member 12*a* to suck and hold one side of the negative electrode 6 and to press the held negative electrode 6 against the lithium metal foil 81. For example, the suction member 12*a* is made of metal, resin, or ceramic, and is not made of rubber.

As illustrated in FIG. 4 the transporting portion 13 includes an arm 31, two rods 32*a* and 32*b*, a slider 33, and a rail 34. The arm 31 includes a barlike support member 31*c* and two hollow cylindrical guide members 31*a* and 31*b*. The support member 31*c* extends horizontally. The guide members 31*a* and 31*b* are joined integrally to different ends of the support member 31*c* and extend vertically downward. Although not illustrated in the drawings, the hollow portions of the guide members 31*a* and 31*b* are connected to a compressor and a vacuum pump.

Each of the rods 32*a* and 32*b* has a hollow cylindrical shape. The rods 32*a* and 32*b* are respectively inserted in the hollow portions of the guide members 31*a* and 31*b* and are moved axially (vertically) by actuation of the compressor and the vacuum pump. The first suction portion 11 is attached to the bottom end of the rod 32*a* with the suction surface thereof facing downward, and the second suction portion 12 is attached to the bottom end of the rod 32*b* with the suction surface thereof facing downward. In FIG. 4, the rod 32*a* is located to the right of the rod 32*b*. Thus, the first suction portion 11 and the second suction portion 12 are arranged beside each other from right to left in FIG. 4 in a direction parallel to an electrode surface of the positive electrode 5 (the negative electrode 6). The hollow portions of the rods 32*a* and 32*b* respectively communicate with the hollow portions of the first suction portion 11 and the second suction portion 12 and are each connected to the vacuum pump, although not illustrated in the drawings.

The slider 33 is movable along the rail 34. Although not illustrated in the drawings, the slider 33 is connected to a driving device that includes a motor and a ball screw mechanism. The slider 33 is fixed to the top surface of the support member 31*c* of the arm 31 at a location substantially in the middle of the support member 31*c* such that the support member 31*c* is parallel to the rail 34. Thus, the slider 33 allows the first suction portion 11 and the second suction portion 12 to move together in a direction parallel to their suction surfaces.

The folding portion 14 has a pair of rollers 14*a* and 14*b*. The pair of rollers 14*a* and 14*b* is supported on a side surface of the support member 31*c* of the arm 31 at a location substantially in the middle of the support member 31*c*. The rolling surfaces of the pair of rollers 14*a* and 14*b* are brought into contact with each other by an elastic force of a spring (not illustrated) such that the pair of rollers 14*a* and 14*b* is rotatable. The separator 7 is inserted between the rollers 14*a* and 14*b* of the folding portion 14. The slider 33 is reciprocated along the rail 34 while the separator 7 is held between the rollers 14*a* and 14*b*. This reciprocating motion of the slider 33 folds the separator 7 in a zigzag pattern. A guiding member for limiting the width of folded portions of the separator 7 or a press mechanism for pressing down the folded portions of the separator 7 may be provided above the stacking table 21 to the right and left of the stacking table 21. Any member that the separator 7 is holdable by can be used instead of the pair of rollers 14*a* and 14*b*.

A stack of the sheetlike positive electrodes 5 is holdable in the positive electrode magazine 16. The positive electrode magazine 16 has a top surface provided with an opening for allowing the topmost positive electrode 5 in the stack to be taken, one by one, out of the positive electrode magazine 16. A stack of the sheetlike negative electrodes 6 is holdable in the negative electrode magazine 17. The negative electrode magazine 17 has a top surface provided with an opening for allowing the topmost negative electrode 6 in the stack to be taken, one by one, out of the negative electrode magazine 17. The separator 7 is wrapped around and held by the separator roll 18. The separator 7 is rotatably supported. The lithium metal foil 81 is wrapped around and held by the doping foil roll 19. The doping foil roll 19 is rotatably supported.

The doping foil feeder 20 includes a cutting device 22 and a press-bonding table 23. The lithium metal foil 81 is drawn from the doping foil roll 19, cut into a predetermined length by the cutting device 22, and then placed on the press-bonding table 23. The top surface of the press-bonding table 23 is provided with a non-metallic member that the lithium metal foil 81 is less likely to stick to than to the negative electrode 6. For example, the non-metallic member may be resin such as polyethylene or polypropylene, ceramic, or paper. Providing such a non-metallic member on the top surface of the press-bonding table 23 is preferable because it is easy for lithium metal to stick to metal or other similar material due to its softness and high reactivity. On the stacking table 21, the separator 7 drawn from the separator roll 18 is placed and folded in a zigzag pattern while the positive electrode 5 transported from the positive electrode magazine 16, the negative electrode 6 transported from the negative electrode magazine 17, and the negative electrode 6 having the lithium metal foil 81 bonded thereto transported from the doping foil feeder 20 are sandwiched between the folded surfaces of the separator 7 so that the multilayer electrode 2 is formed.

Below the transporting portion 13, the positive electrode magazine 16, the stacking table 21, the negative electrode magazine 17, and the doping foil feeder 20 are arranged in this order along the rail 34 in the horizontal direction. The positive electrode magazine 16, the stacking table 21, the negative electrode magazine 17, and the doping foil feeder 20 are arranged to be equally spaced by the same distance as the rods 32a and 32b of the transporting portion 13 are spaced, i.e., by the same distance as the first suction portion 11 and the second suction portion 12 are spaced. A location where the doping foil feeder 20 is arranged is referred to as a bonding location, and a location where the stacking table 21 is arranged is referred to as a stacking location. The separator roll 18 is located above the stacking table 21 and the folding portion 14. The doping foil roll 19 is arranged beside the doping foil feeder 20 in the horizontal direction.

The control device 15 includes a sandwiching control portion 151, a doping foil bonding control portion 152, and a doping foil sandwiching control portion 153. The detailed operation of the control portions 151, 152, and 153 are described later. In the manufacture of the multilayer electrode 2, the control device 15 controls the operation of the first suction portion 11 and the transporting portion 13 so that each time the separator 7 is folded, the positive electrode 5 and the negative electrode 6 are alternately sandwiched between the folded surfaces of the separator 7, and controls the operation of the second suction portion 12 and the transporting portion 13 so that the negative electrode 6 having the lithium metal foil 81 bonded thereto is sandwiched between a predetermined pair of the folded surfaces of the separator 7.

Figure 7:
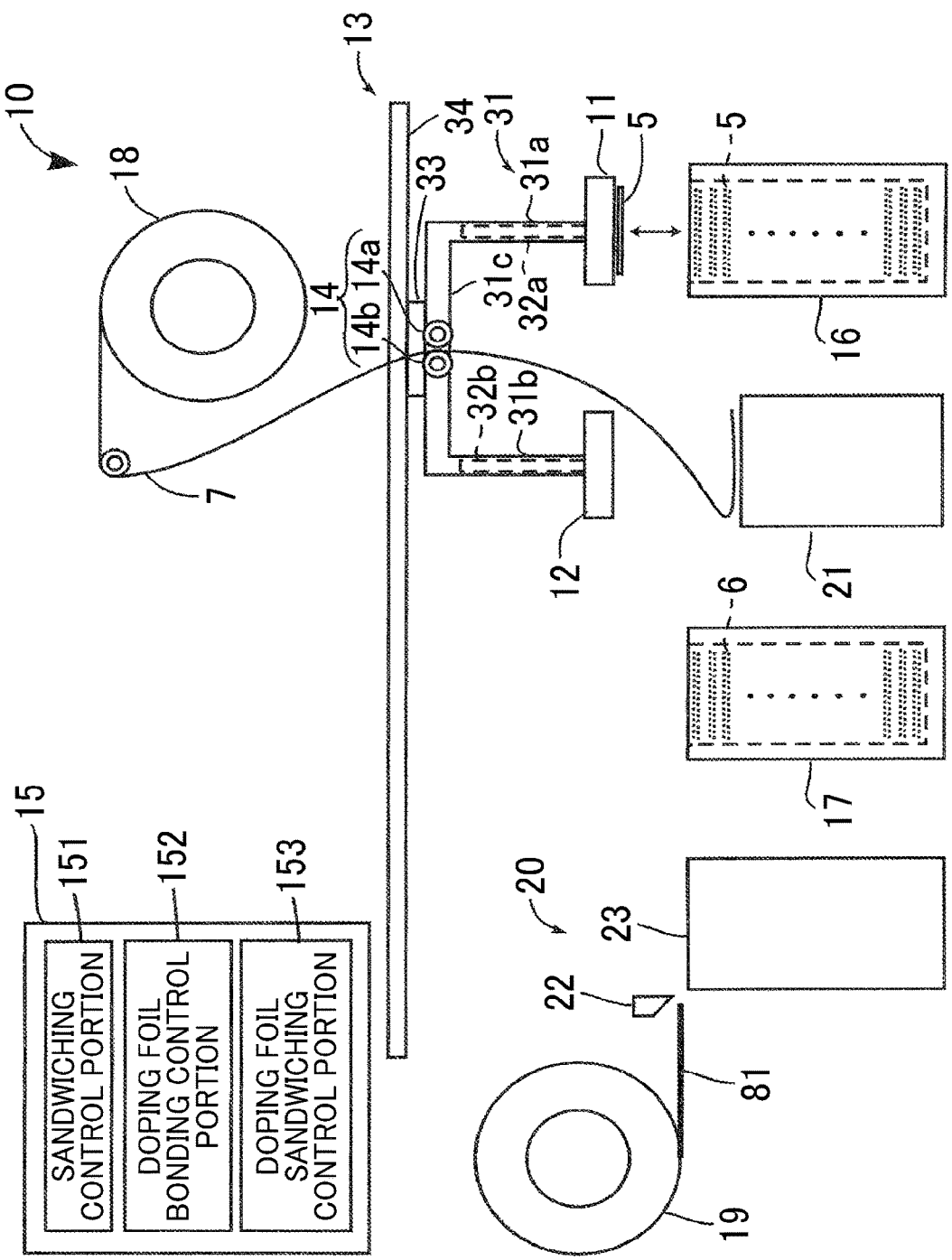
FIG. 7 is a diagram illustrating how the apparatus sucks and holds a positive electrode.

Next, the operation of the apparatus 10 for manufacturing the multilayer electrode 2 is described with reference to the drawings. As illustrated in FIG. 7, before the apparatus 10 starts operating, a stack of the positive electrodes 5 is held in the positive electrode magazine 16, a stack of the negative electrodes 6 is held in the negative electrode magazine 17, and the tip end portion of the separator 7 that is drawn from the separator roll 18 and passed between the pair of rollers 14a and 14b is placed on the stacking table 21.

Figure 6:
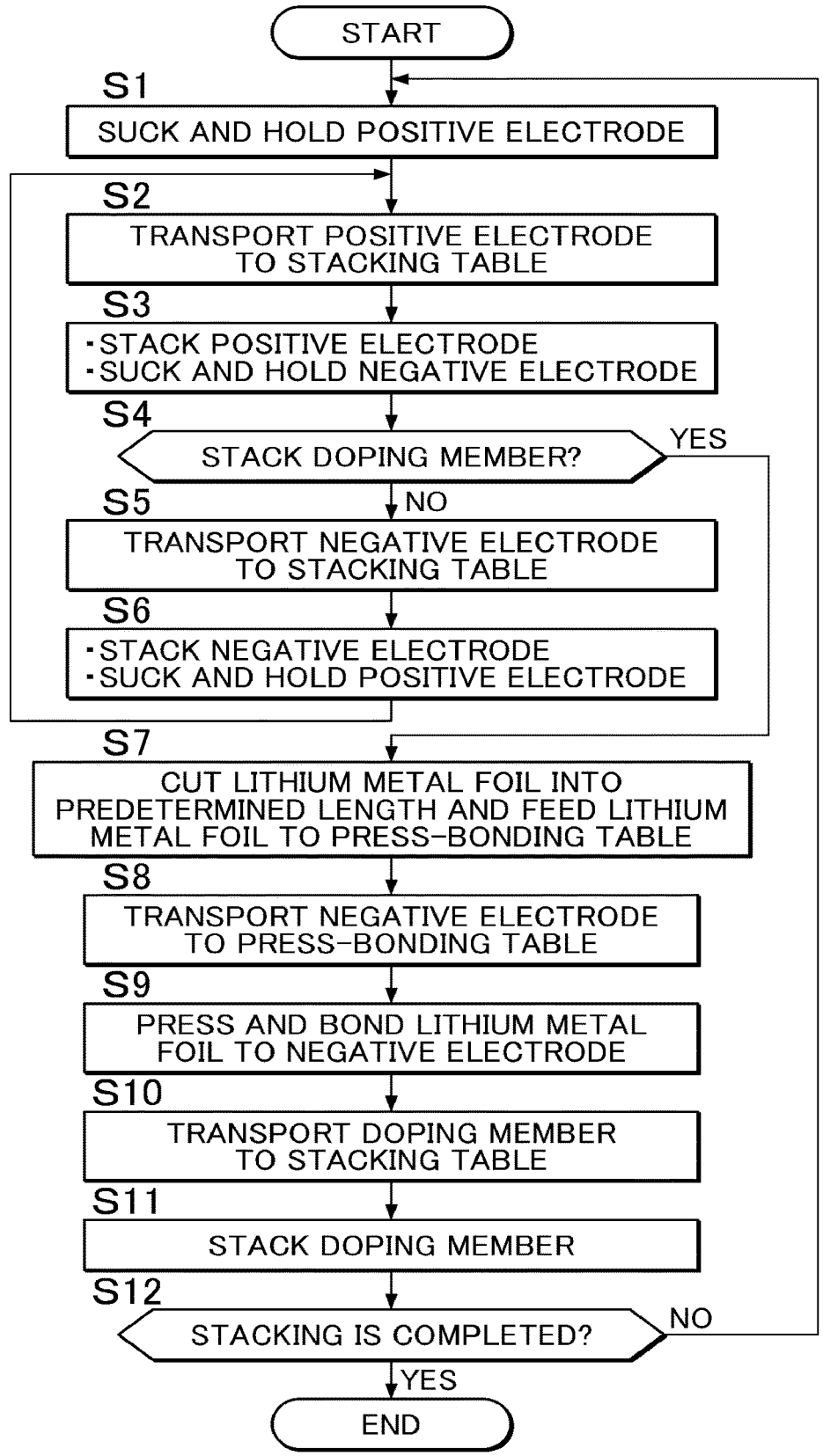
FIG. 6 is a flowchart illustrating the operation of the apparatus.

First, the control device 15 sucks and holds one side of the positive electrode 5 (step S1 in FIG. 6, a first sandwiching process). Specifically, as illustrated in FIG. 7, the sandwiching control portion 151 moves the slider 33 so that the first suction portion 11 is positioned above the positive electrode magazine 16, moves the rod 32a downward until the first suction portion 11 comes in contact with the topmost positive electrode 5 in the stack held in the positive electrode magazine 16, causes the first suction portion 11 to produce negative pressure to suck and hold one side of the topmost positive electrode 5, and then moves the rod 32a upward to move the first suction portion 11 upward.

Figure 8:
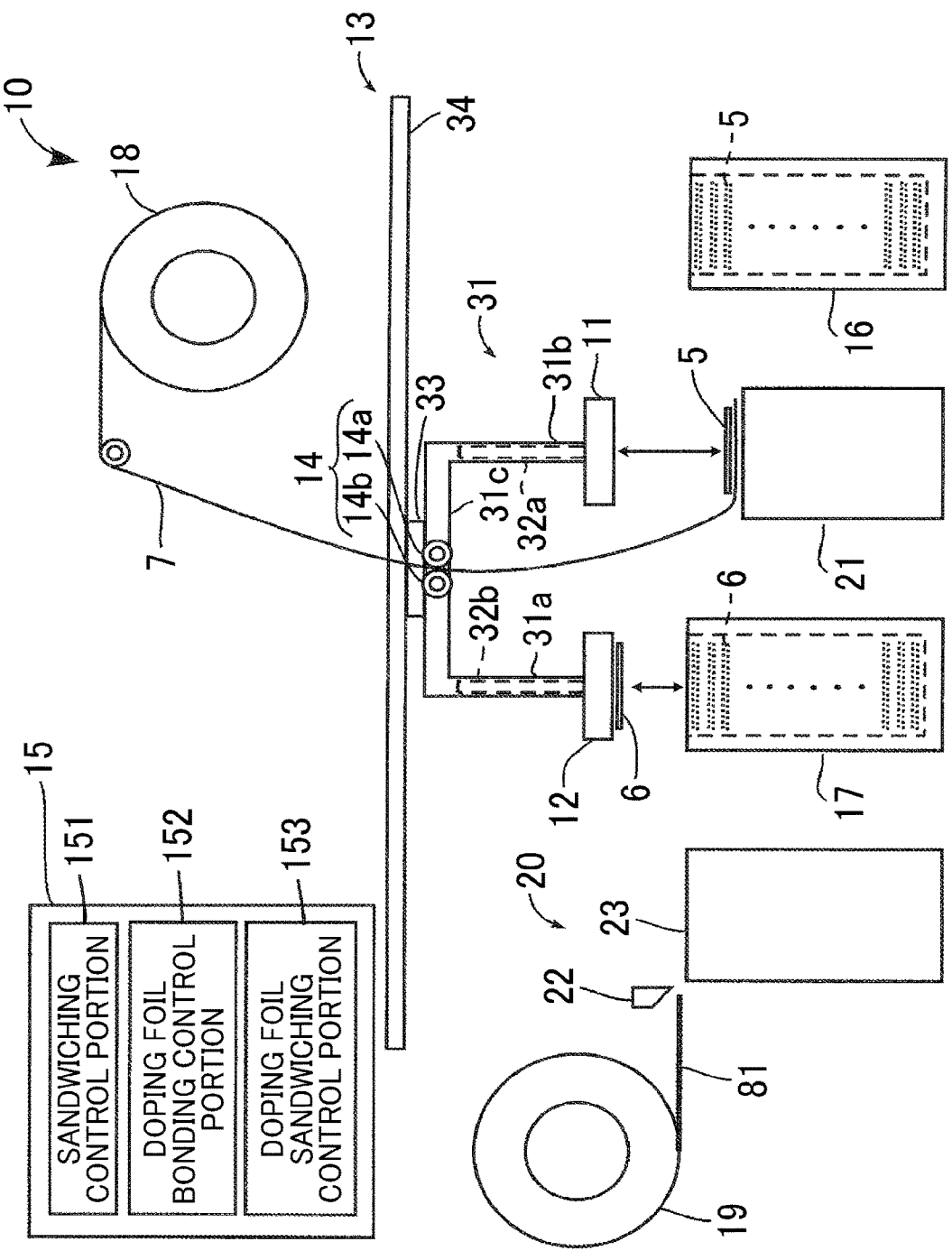
FIG. 8 is a diagram illustrating how the apparatus sandwiches the positive electrode between folded surfaces of a separator while sucking and holding a negative electrode.

Next, the control device 15 transports the positive electrode 5 to the stacking table 21 (step S2 in FIG. 6, the first sandwiching process) and stacks the positive electrode 5 on the separator 7 while sucking and holding one side of the negative electrode 6 (step S3 in FIG. 6, the first sandwiching process, a second sandwiching process). Specifically, as illustrated in FIG. 8, the sandwiching control portion 151 moves the slider 33 until the first suction portion 11 is positioned above the stacking table 21, moves the rod 32a downward until the positive electrode 5 held by the first suction portion 11 is placed on the top surface of the separator 7 on the stacking table 21, and causes the first suction portion 11 to release negative pressure, thereby stacking the positive electrode 5 on the separator 7.

At this time, since the second suction portion 12 is positioned above the negative electrode magazine 17, the sandwiching control portion 151 moves the rod 32b downward until the second suction portion 12 comes in contact with the topmost negative electrode 6 in the stack held in the negative electrode magazine 17, causes the second suction portion 12 to produce negative pressure to suck and hold one side of the topmost negative electrode 6, and then moves the rod 32b upward to move the second suction portion 12 upward.

Then, the control device 15 determines whether to stack the negative electrode 6 having the lithium metal foil 81 bonded thereto on the separator 7 (step S4 in FIG. 6). Specifically, the control device 15 determines whether to stack the negative electrode 6 having the lithium metal foil 81 bonded thereto on the separator 7 by determining whether the total number of the positive electrodes 5 and the negative electrodes 6 stacked on the separator 7 reaches a predetermined number, for example, five.

Figure 9:
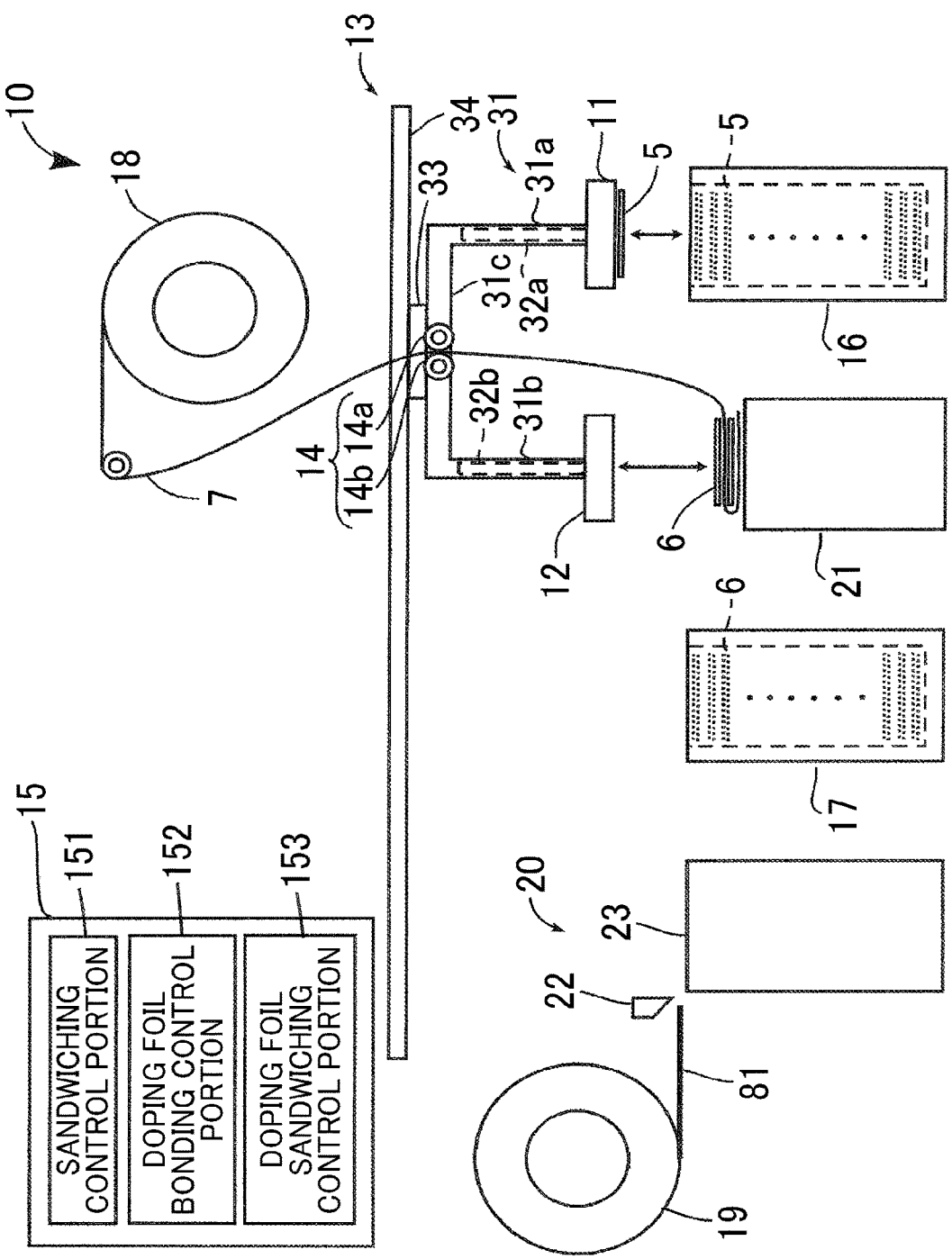
FIG. 9 is a diagram illustrating how the apparatus sandwiches the negative electrode between the folded surfaces of the separator while sucking and holding the positive electrode.

If determining not to stack the negative electrode 6 having the lithium metal foil 81 bonded thereto on the separator 7, the control device 15 transports the negative electrode 6 to the stacking table 21 (step S5 in FIG. 6, the second sandwiching process), stacks the negative electrode 6 on the separator 7 while sucking and holding one side of the positive electrode 5 (step S6 in FIG. 6, the second sandwiching process, the first sandwiching process), and then returns to step 2 to repeat the procedures described above. Specifically, as illustrated in FIG. 9, the sandwiching control portion 151 moves the slider 33 until the second suction portion 12 is positioned above the stacking table 21, moves the rod 32b downward until the negative electrode 6 held by the second suction portion 12 is placed on the top surface of the separator 7 folded on the stacking table 21, and causes the second suction portion 12 to release negative pressure, thereby stacking the negative electrode 6 on the separator 7.

Figure 10:
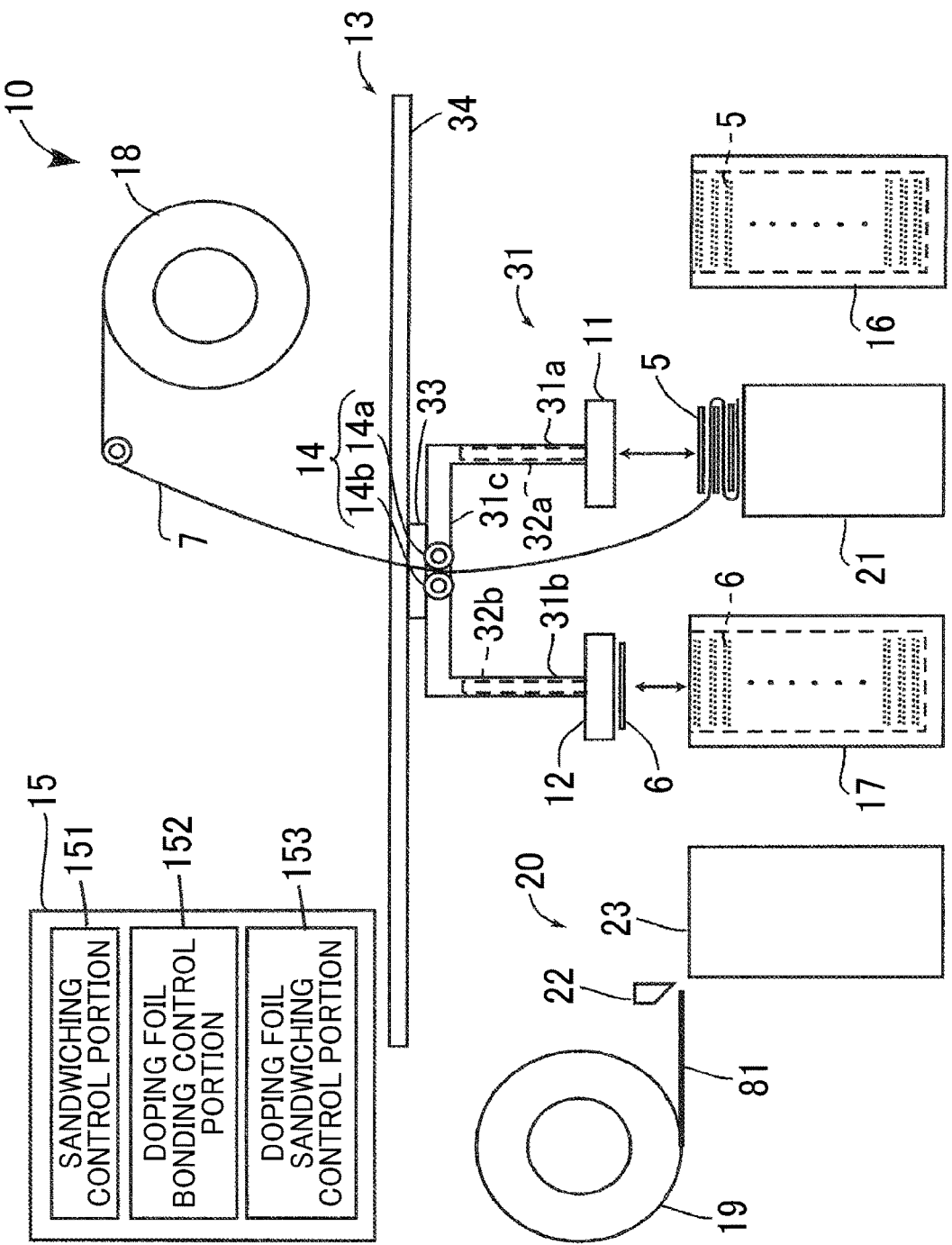
FIG. 10 is a diagram illustrating how the apparatus sandwiches the positive electrode between the folded surfaces of the separator while sucking and holding the negative electrode.
Figure 11:
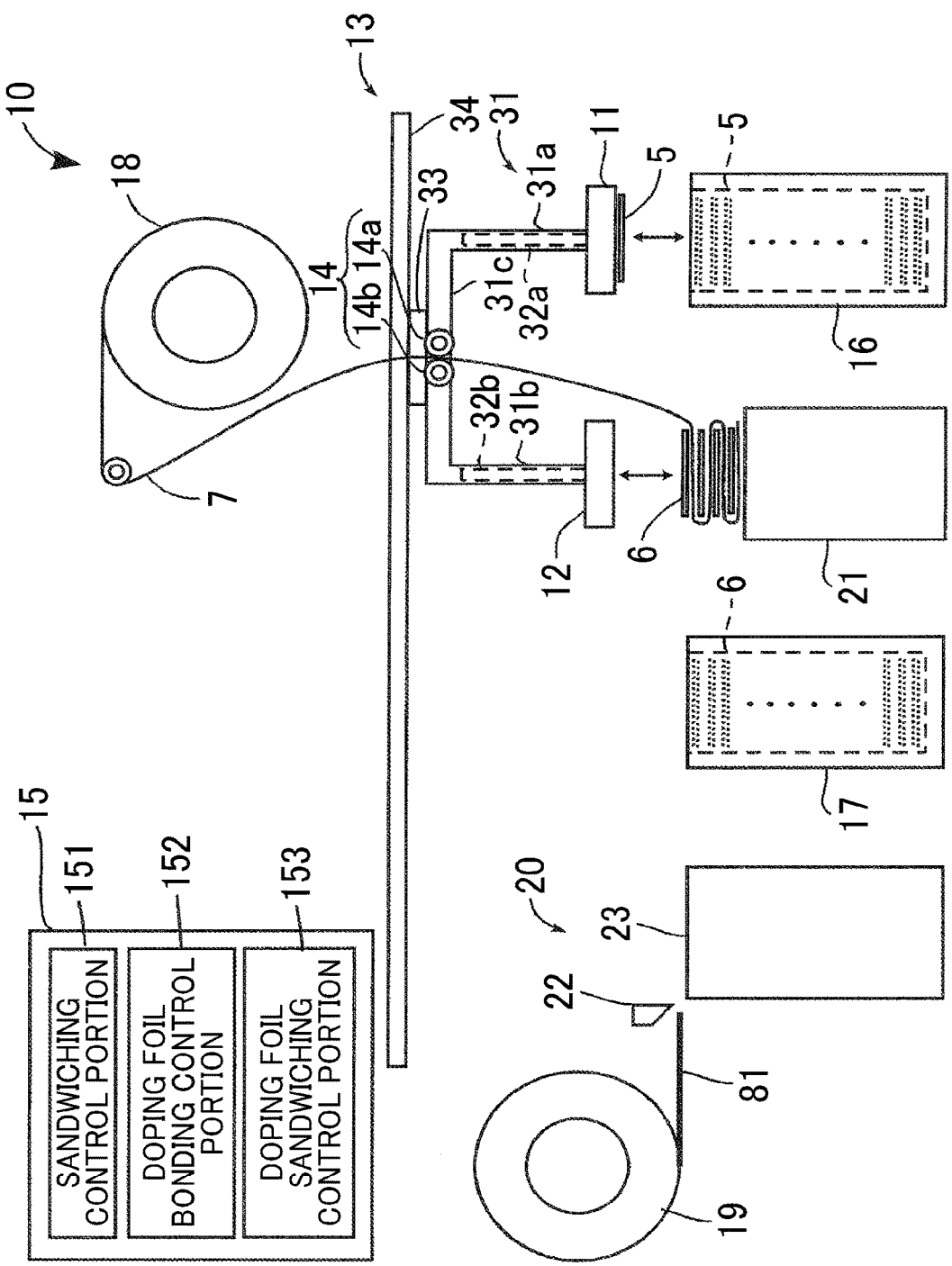
FIG. 11 is a diagram illustrating how the apparatus sandwiches the negative electrode between the folded surfaces of the separator while sucking and holding the positive electrode.

At this time, since the first suction portion 11 is positioned above the positive electrode magazine 16, the sandwiching control portion 151 moves the rod 32a downward until the first suction portion 11 comes in contact with the topmost positive electrode 5 in the stack held in the positive electrode magazine 16, causes the first suction portion 11 to produce negative pressure to suck and hold one side of the topmost positive electrode 5, and then moves the rod 32a upward to move the first suction portion 11 upward. Subsequently, the positive electrode 5 and the negative electrode 6 are alternately stacked on the separator 7, as illustrated in FIG. 10 and FIG. 11.

Figure 12:
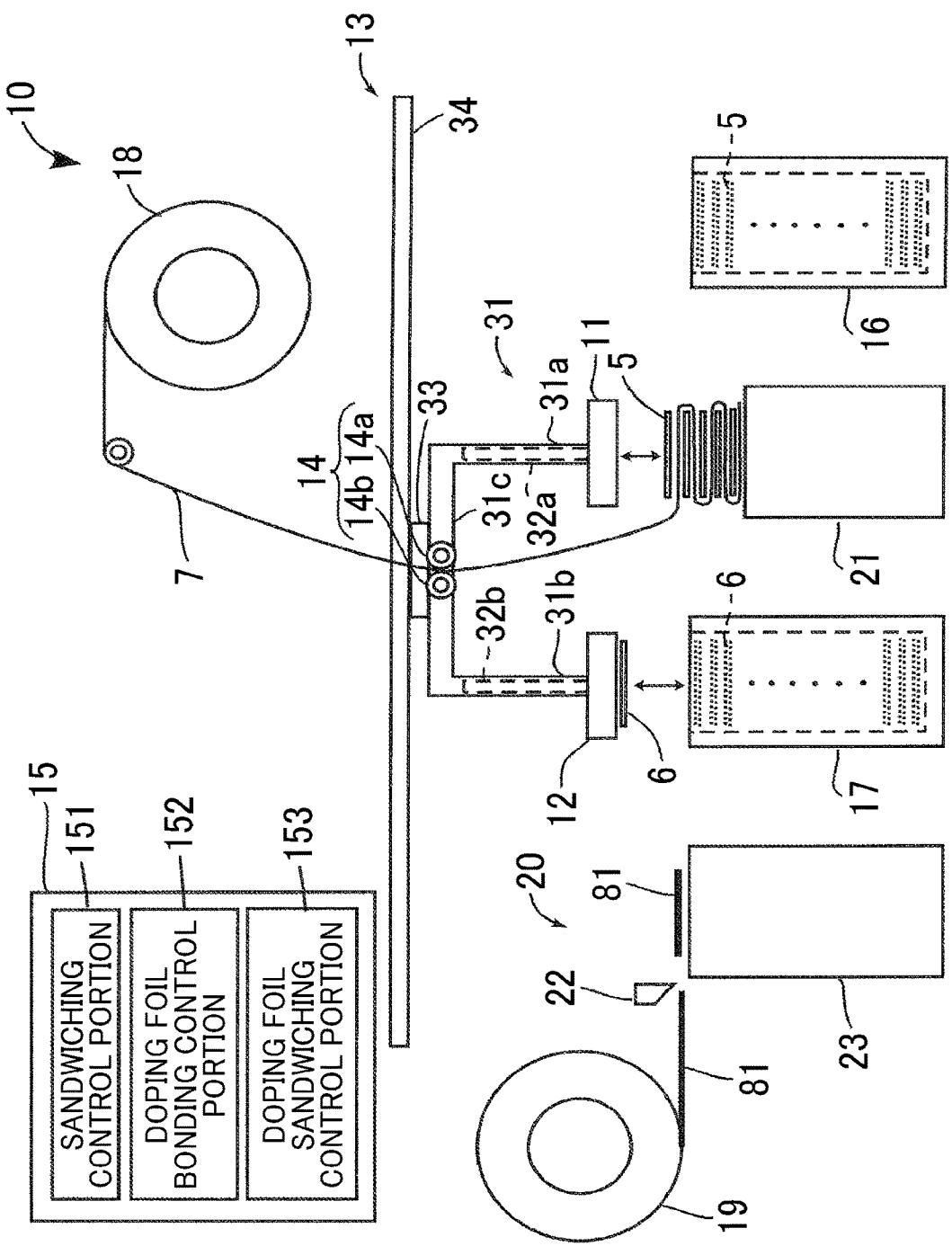
FIG. 12 is a diagram illustrating how the apparatus sandwiches the positive electrode between the folded surfaces of the separator while sucking and holding the negative electrode and while drawing out and cutting off lithium metal foil.

In contrast, if determining to stack the negative electrode 6 having the lithium metal foil 81 bonded thereto on the separator 7, the control device 15 cuts the lithium metal foil 81 into a predetermined length and feeds the cut lithium metal foil 81 to the press-bonding table 23 (step S7 in FIG. 6, a bonding process). Specifically, as illustrated in FIG. 12, the doping foil bonding control portion 152 controls the doping foil feeder 20 so that the lithium metal foil 81 is drawn from the doping foil roll 19, the drawn lithium metal foil 81 is cut into a predetermined length, and the cut lithium metal foil 81 is placed on the press-bonding table 23.

Figure 13:
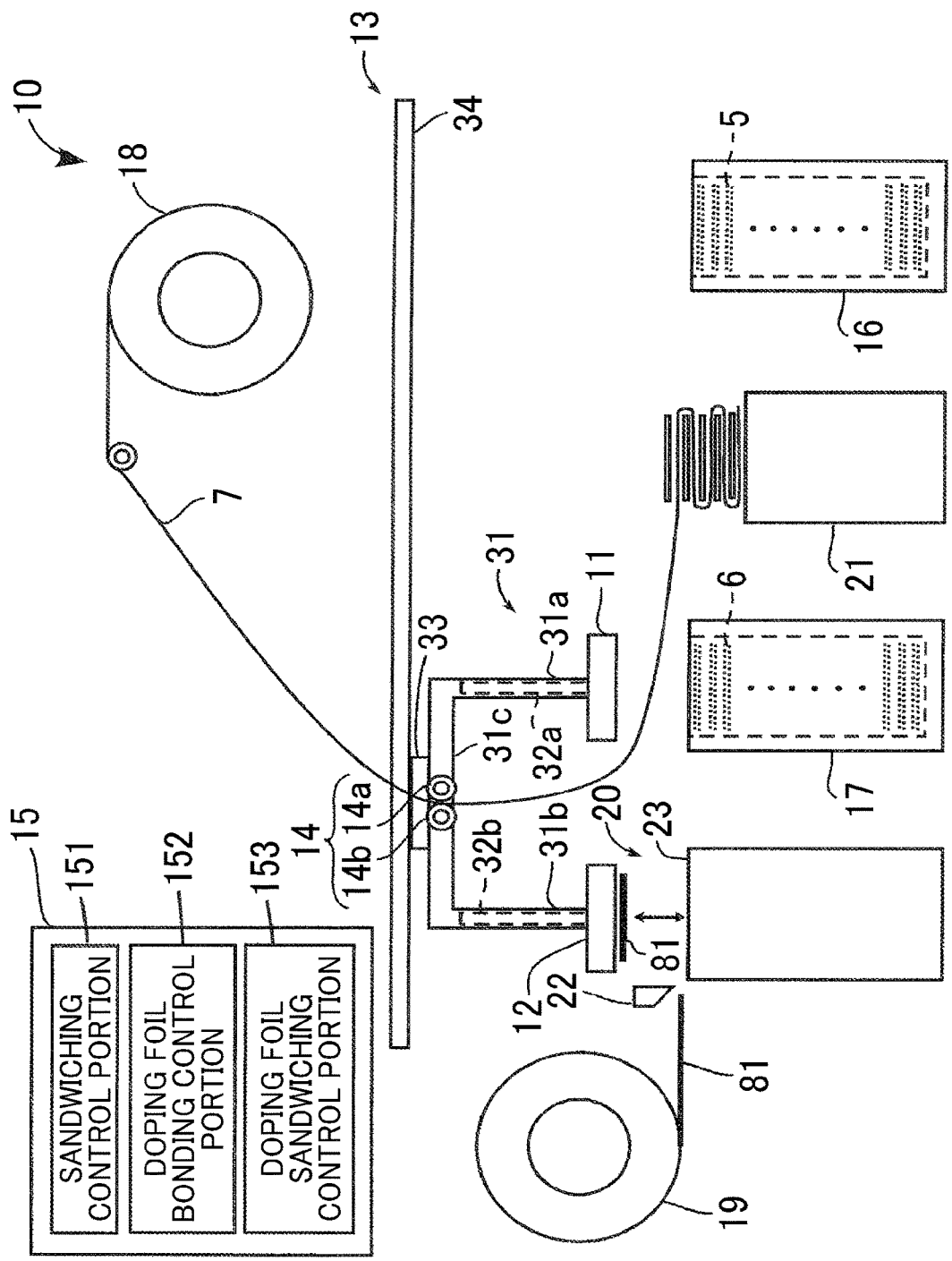
FIG. 13 is a diagram illustrating how the apparatus bonds the lithium metal foil to the negative electrode.

Next, the control device 15 transports the negative electrode 6 to the press-bonding table 23 (step S8 in FIG. 6, the bonding process) and bonds the lithium metal foil 81 to the negative electrode 6 (step S9 in FIG. 6, the bonding process). Specifically, as illustrated in FIG. 13, the doping foil bonding control portion 152 moves the slider 33 until the second suction portion 12 is positioned above the press-bonding table 23, moves the rod 32b downward until the negative electrode 6 held by the second suction portion 12 is pressed against the lithium metal foil 81 placed on the press-bonding table 23, thereby bonding the lithium metal foil 81 to the negative electrode 6.

Figure 14:
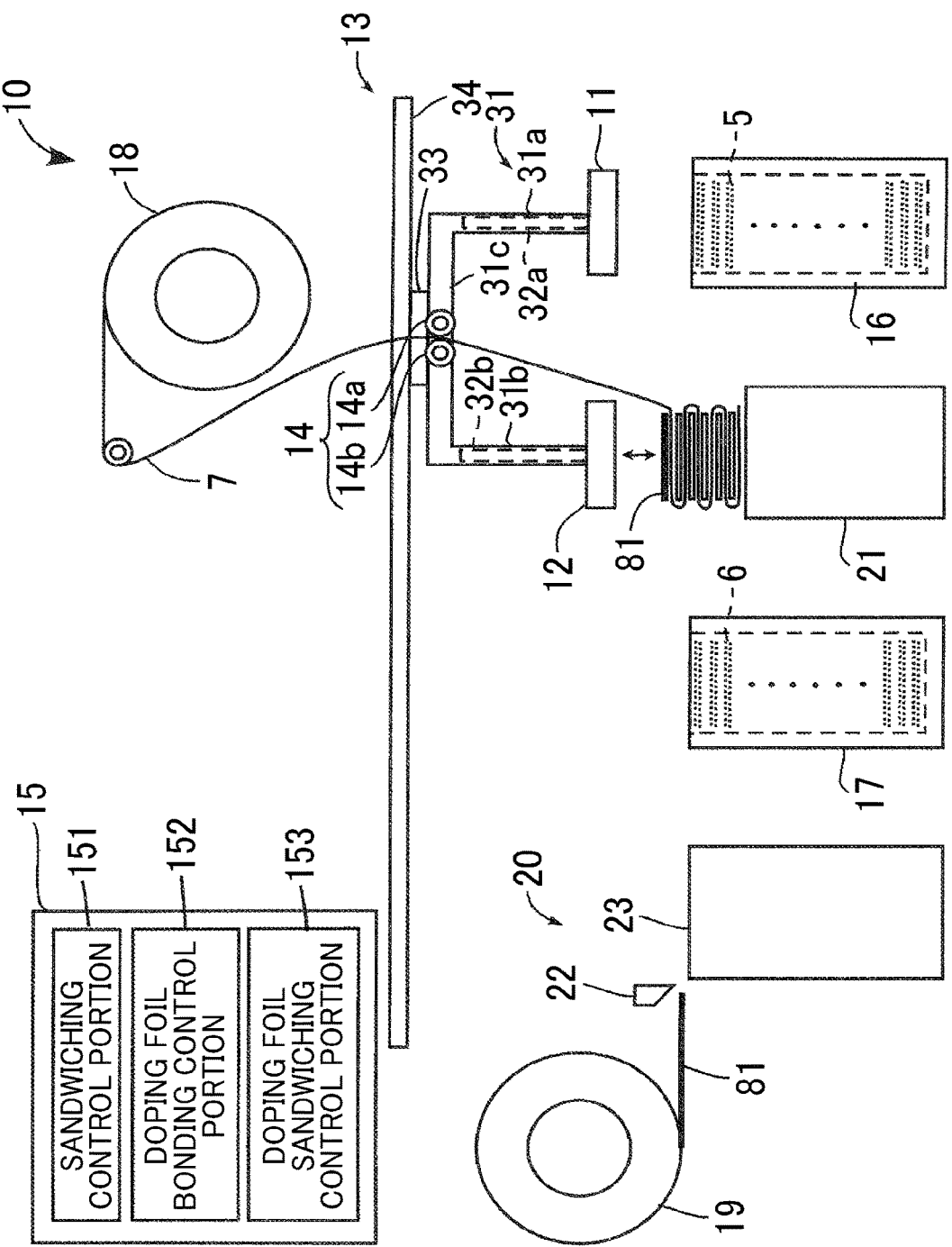
FIG. 14 is a diagram illustrating how the apparatus sandwiches the negative electrode having the lithium metal foil bonded thereto between the folded surfaces of the separator.

Then, the control device 15 transports the negative electrode 6 having the lithium metal foil 81 bonded thereto to the stacking table 21 (step S10 in FIG. 6, a third sandwiching process) and stacks the negative electrode 6 having the lithium metal foil 81 bonded thereto on the separator 7 (step S11 in FIG. 6, the third sandwiching process). Specifically, as illustrated in FIG. 14, the doping foil sandwiching control portion 153 moves the slider 33 until the second suction portion 12 is positioned above the stacking table 21, moves the rod 32b downward until the negative electrode 6 having the lithium metal foil 81 bonded thereto held by the second suction portion 12 is placed on the top surface of the separator 7 folded on the stacking table 21, and causes the second suction portion 12 to release negative pressure, thereby stacking the negative electrode 6 having the lithium metal foil 81 bonded thereto on the separator 7.

Then, the control device 15 determines whether stacking the positive electrode 5, the negative electrode 6, and the negative electrode 6 having the lithium metal foil 81 bonded thereto is completed (step S12 in FIG. 6). If determining that the stacking is not completed yet, the control device 15 returns to step S1 to repeat the procedures described above. In contrast, if determining that the stacking is completed, the control device 15 ends all the procedures.

According to the embodiment, the negative electrode 6 is used as a current collector for doping that the lithium metal foil 81 is to be bonded to. Alternatively, any other metal that is not reactive to lithium can be used as a current collector for doping that the lithium metal foil 81 is to be bonded to. For example, copper, nickel, or stainless may be used as the current collector. In this case, a magazine for holding a stack of sheetlike current collectors made of the alternative metal is arranged. Alternatively, the lithium metal foil 81 may be bonded to the positive electrode 5.

According to the embodiment, the separator 7 is drawn from the separator roll 18 and folded in a zigzag pattern. Alternatively, the separator 7 may be cut into rectangular pieces, and the piece of the separator 7 may be inserted in a stacked manner between the positive electrode 5 and the negative electrode 6.

According to the embodiment, the single transporting portion 13 collectively transports the first suction portion 11, the second suction portion 12, and the folding portion 14. Alternatively, each of the first suction portion 11, the second suction portion 12, and the folding portion 14 may be provided with their individual transporting portion. Alternatively, the first suction portion 11, the second suction portion 12, and the folding portion 14 may be grouped, and each group may be provided with their individual transporting portion.

According to the embodiment, the apparatus 10 for manufacturing the multilayer electrode 2 includes the following: the first suction portion 11 that has the suction surface for sucking and holding the sheetlike positive electrode 5 and that is movable in a direction parallel to the suction surface thereof; the second suction portion 12 that is located beside the first suction portion 11 in a direction parallel to the suction surface of the first suction portion 11, that has the suction surface for sucking and holding the sheetlike negative electrode 6, and that is movable in a direction parallel to the suction surface thereof; the folding portion 14 for folding the tapelike separator 7; and the control device 15 for controlling the operation of the first suction portion 11, the second suction portion 12, and the folding portion 14.

The control device 15 includes the sandwiching control portion 151, the doping foil bonding control portion 152, and the doping foil sandwiching control portion 153. The sandwiching control portion 151 controls the operation of the first suction portion 11, the second suction portion 12, and the folding portion 14 so that each time the separator 7 is folded, the positive electrode 5 and the negative electrode 6 are alternately sandwiched between folded surfaces of the separator 7. The doping foil bonding control portion 152 controls the operation of at least one of the first suction portion 11 and the second suction portion 12 so that the doping foil (lithium metal foil) 81 is bonded to one of a current collector for doping, the positive electrode 5, and the negative electrode 6 held by the at least one of the first suction portion 11 and the second suction portion 12. The doping foil sandwiching control portion 153 controls the at least one of the first suction portion 11 and the second suction portion 12 so that the one of the current collector, the positive electrode 5, and the negative electrode 6 having the lithium metal foil 81 bonded thereto is transported and sandwiched between the predetermined pair of the folded surfaces of the separator 7.

As such, the apparatus 10 stacks the positive electrode 5 and the negative electrode 6 on the separator 7 while bonding the lithium metal foil 81 to one of the current collector, the positive electrode 5, and the negative electrode 6 and while sandwiching the one of the current collector, the positive electrode 5, and the negative electrode 6 having the lithium metal foil 81 bonded thereto between the folded surfaces of the separator 7. This makes it possible to reduce the size of the apparatus 10 and the manufacturing cost of the multilayer electrode 2. Further, the apparatus 10 makes it possible to place the one of the current collector, the positive electrode 5, and the negative electrode 6 having the lithium metal foil 81 bonded thereto at a predetermined location in a stack structure of the positive electrode 5 and the negative electrode 6, thus reducing the time necessary for doping.

The doping foil bonding control portion 152 may control the operation of the second suction portion 12 so that the lithium metal foil 81 is bonded to the negative electrode 6 held by the second suction portion 12, and the doping foil sandwiching control portion 153 may control the operation of the second suction portion 12 so that the negative electrode 6 having the lithium metal foil 81 bonded thereto is transported and sandwiched between the predetermined pair of the folded surfaces of the separator 7, thereby manufacturing the multilayer electrode 2. This allows the negative electrode 6 to be used as a current collector for doping, thus reducing the size of the apparatus 10 and the manufacturing cost of the multilayer electrode 2.

The first suction portion 11 and the second suction portion 12 may respectively include the suction members 11a and 12a each having a through hole. This makes it possible to transport the positive electrode 5 and the negative electrode 6 without tilting the positive electrode 5 and the negative electrode 6. The apparatus 10 may further include the following: the doping foil roll 19 that a tapelike doping foil member as a material for the lithium metal foil 81 is wrapped around; and the doping foil feeder 20 that feeds the lithium metal foil 81 by drawing the doping foil member from the doping foil roll 19 and by cutting the drawn doping foil member into a predetermined length. This ensures that the lithium metal foil 81 that is difficult to handle is pressed against and bonded to the one of the current collector, the positive electrode 5, and the negative electrode 6.

The doping foil feeder 20 may include the press-bonding table 23 where the cut lithium metal foil 81 is pressed against and bonded to the one of the current collector, the positive electrode 5, and the negative electrode 6, and the press-bonding table 23 may be provided with a non-metallic member that the lithium metal foil 81 is less likely to stick to than to the one of the current collector, the positive electrode 5, and the negative electrode 6. This makes it possible to transport the one of the current collector, the positive electrode 5, and the negative electrode 6 having the lithium metal foil 81 bonded thereto from the press-bonding table 23 without detaching the lithium metal foil 81.

The method according to the embodiment is for manufacturing the multilayer electrode 2 by alternately sandwiching the sheetlike positive electrode 5 and the sheetlike negative electrode 6 between the folded surfaces of the separator 7 each time the separator 7 is folded, and by sandwiching one of a current collector for doping, the positive electrode 5, and the negative electrode 6 having the lithium metal foil 81 bonded thereto between the predetermined pair of the folded surfaces of the separator 7. The method includes the first sandwiching process, the second sandwiching process, a bonding process, and the third sandwiching process. The first sandwiching process includes the following: sucking and holding one of the positive electrode 5 and the negative electrode 6; transporting the one of the positive electrode 5 and the negative electrode 6 to the stacking location; and sandwiching the one of the positive electrode 5 and the negative electrode 6 between the folded surfaces of the separator 7 fed to the stacking location. The second sandwiching process includes the following: sucking and holding the other of the positive electrode 5 and the negative electrode 6; transporting the other of the positive electrode 5 and the negative electrode 6 to the stacking location; and sandwiching the other of the positive electrode 5 and the negative electrode 6 between the folded surfaces of the separator 7 folded by transportation of the other of the positive electrode 5 and the negative electrode 6 to the stacking location.

The bonding process is performed when a predetermined folded surface of the separator 7 appears and includes the following: sucking and holding the one of the current collector, the positive electrode 5, and the negative electrode 6, and; transporting the one of the current collector, the positive electrode 5, and the negative electrode 6 to the bonding location; and bonding the lithium metal foil 81 fed to the bonding location to the one of the current collector, the positive electrode 5, and the negative electrode 6. The third sandwiching process includes the following: transporting the one of the current collector, the positive electrode 5, and the negative electrode 6 having the lithium metal foil 81 bonded thereto to the stacking location; and sandwiching the one of the current collector, the positive electrode 5, and the negative electrode 6 having the lithium metal foil 81 bonded thereto between the predetermined pair of the folded surfaces of the separator 7. Thus, this method has the same effect as the apparatus 10. Further, this method makes it possible to place a suitable number of doping members at suitable locations in accordance with the number of stacked electrodes determined by the energy storage capacity or size of an electric energy storage device. Since the doping member is stacked together with, and at the same time as, the one of the current collector, the positive electrode, and the negative electrode, the doping member is accurately stacked without a complicated process, so that doping is achieved reliably.

What is claimed is:

1. An apparatus for manufacturing a multilayer electrode, the apparatus comprising:
    a first suction portion including a suction surface to suck and hold a positive electrode, the first suction portion movable in a direction parallel to the suction surface of the first suction portion;
    a second suction portion located beside the first suction portion in a direction parallel to the suction surface of the first suction portion and including a suction surface to suck and hold a negative electrode, the second suction portion movable in a direction parallel to the suction surface of the second suction portion;
    a folding portion to fold a separator; and
    a control device configured to control operation of the first suction portion, the second suction portion, and the folding portion, wherein
    the control device includes a sandwiching control portion, a doping foil bonding control portion, and a doping foil sandwiching control portion,
    the sandwiching control portion controls the operation of the first suction portion, the second suction portion, and the folding portion so that each time the separator is folded, the positive electrode and the negative electrode are alternately sandwiched between folded surfaces of the separator,
    the doping foil bonding control portion controls the operation of at least one of the first suction portion and the second suction portion so that doping foil is bonded to one of a current collector for doping, the positive electrode, and the negative electrode, the one of the current collector, the positive electrode, and the negative electrode being sucked and held by the at least one of the first suction portion and the second suction portion, and the doping foil sandwiching control portion controls the at least one of the first suction portion and the second suction portion so that the one of the current collector, the positive electrode, and the negative electrode having the doping foil bonded thereto is transported and sandwiched between a predetermined pair of the folded surfaces of the separator.

2. The apparatus according to claim 1, wherein
the doping foil bonding control portion controls the operation of the second suction portion so that the doping foil is bonded to the negative electrode sucked and held by the second suction portion, and
the doping foil sandwiching control portion controls the operation of the second suction portion so that the negative electrode having the doping foil bonded to the negative electrode is transported and sandwiched between the predetermined pair of the folded surfaces of the separator, thereby manufacturing the multilayer electrode.

3. The apparatus according to claim 1, wherein
each of the first suction portion and the second suction portion includes a suction member including a through hole.

4. The apparatus according to claim 1, further comprising:
a doping foil roll that a doping foil member as a material for the doping foil is wrapped around; and
a doping foil feeder that feeds the doping foil by drawing the doping foil member from the doping foil roll and by cutting the drawn doping foil member into a predetermined length.

5. The apparatus according to claim 4, wherein
the doping foil feeder includes a press-bonding table where the doping foil is pressed against and bonded to the one of the current collector, the positive electrode, and the negative electrode, and
the press-bonding table includes a non-metallic member that the doping foil is less likely to stick to than to the one of the current collector, the positive electrode, and the negative electrode.

* * * * *